United States Patent
Jin et al.

(10) Patent No.: US 10,395,424 B2
(45) Date of Patent: Aug. 27, 2019

(54) METHOD AND APPARATUS OF COPYING DATA TO REMOTE MEMORY

(71) Applicant: Advanced Micro Devices, Inc., Sunnyvale, CA (US)

(72) Inventors: Guohua Jin, Boxborough, MA (US); Todd Martin, Orlando, FL (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/389,204

(22) Filed: Dec. 22, 2016

(65) Prior Publication Data

US 2018/0181306 A1   Jun. 28, 2018

(51) Int. Cl.
  *G06T 17/20*    (2006.01)
  *G06T 15/00*    (2011.01)
  *G06T 1/60*     (2006.01)
  *G06F 9/46*     (2006.01)

(52) U.S. Cl.
  CPC ............... *G06T 17/20* (2013.01); *G06F 9/46* (2013.01); *G06T 1/60* (2013.01); *G06T 15/005* (2013.01)

(58) Field of Classification Search
  None
  See application file for complete search history.

(56) References Cited

U.S. PATENT DOCUMENTS

| 9,105,125 | B2 | 8/2015 | Martin et al. | |
|---|---|---|---|---|
| 2012/0017062 | A1* | 1/2012 | Goel | G06F 9/3851 |
| | | | | 711/170 |
| 2014/0152675 | A1* | 6/2014 | Martin | G06L 17/20 |
| | | | | 345/506 |
| 2017/0053374 | A1* | 2/2017 | Howes | G06T 1/20 |

* cited by examiner

*Primary Examiner* — Denise Tran
(74) *Attorney, Agent, or Firm* — Volpe and Koenig, P.C.

(57) ABSTRACT

A method and apparatus of copying data from a first memory location to a second memory location includes performing a copy operation selected out of one or more copy operations. The copy operations include performing interleaved data copying, performing a full wavefront copy operation, copying all data to a local data store (LDS) prior to copying to the second memory location, or pipelining the data for copying. The copy operation is applied to copy the data from the first location to the second memory location.

20 Claims, 11 Drawing Sheets

METHOD AND APPARATUS OF COPYING DATA TO REMOTE MEMORY

BACKGROUND

Off-chip tessellation stores tessellation related data in remote, (e.g., off-chip), memory. It allows cross compute unit execution and enables tessellation redistribution for achieving better load balancing. That is, it allows data to be stored to a location for more than one compute unit or shader engine to access it and perform processing on it. It has been supported for multiple generations of graphics processing units (GPUs). However, there are inefficiencies and latencies associated with redistributing tessellation for load balancing.

BRIEF DESCRIPTION OF THE DRAWINGS

A more detailed understanding can be had from the following description, given by way of example in conjunction with the accompanying drawings.

DETAILED DESCRIPTION

Figure 1A:
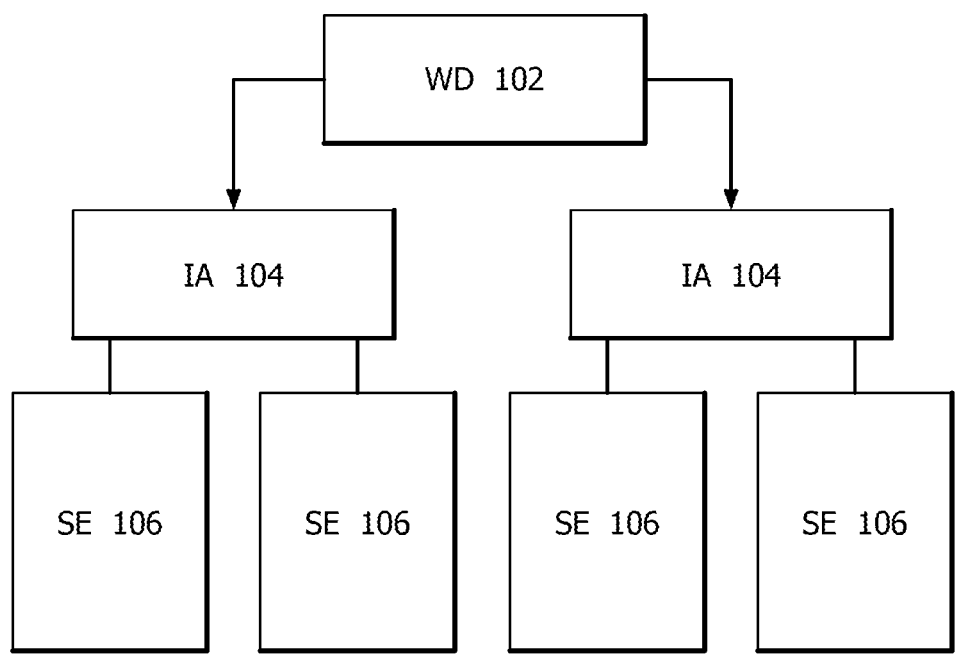
FIG. 1A is a block diagram of an example graphics pipeline.

Although a more detailed description follows, briefly, disclosed herein are a method and apparatus for copying data from a first, (e.g., local) memory location to a remote memory location. For example, a method for hull shaders to improve memory access efficiency and achieve better cache bandwidth utilization is described that utilizes interleaved data copying, multiple-element copying using full wavefront copying, copying all data to a remote memory location through a local data store (LDS), or copying data using software pipelining.

A method of copying data from a first location to a second memory location is disclosed herein. The method includes performing a copy operation selected out of one or more copy operations including: performing interleaved data copying, performing a full wavefront copy operation, copying all data to an LDS prior to copying to the second memory location, or pipelining the data for copying. The copy operation is applied to copy the data from the first location to the remote memory location.

An apparatus is disclosed herein. The apparatus includes a first memory location, a second memory location, and a processor operatively coupled with the first and second memory locations. The processor performs a copy operation selected out of one or more copy operations including: performing a full wavefront copy operation, copying all data to an LDS prior to copying to the second memory location, or pipelining the data for copying. The processor also applies the copy operation to copy the data from the first location to the second memory location.

A non-transitory computer-readable medium having instructions recorded thereon, that when executed by a computing device, causes the computing device to perform operations is disclosed herein. The instructions include performing a copy operation selected out of one or more copy operations including: performing interleaved data copying, performing a full wavefront copy operation, copying all data to an LDS prior to copying to the second memory location, or pipelining the data for copying. The instructions also include applying the copy operation to copy the data from the first memory location to the second memory location.

Display images comprise thousands of dots, where each dot represents one of thousands or millions of colors. These dots are known as picture elements, or "pixels". Each pixel has multiple attributes, such as, color and texture attributes. Those attributes are manipulated and processed before being rendered on a display screen of an electronic device.

Pixels typically form two dimensional (2D) representation of graphical objects. Example graphical objects include points, lines, polygons, and three-dimensional (3D) solid objects. One or more of these graphical data objects, (e.g., polygons), constitutes a patch. Patches can be divided into work groups, which are groups that can include multiple wavefronts/waves, (described in further detail below) for processing on shader engines, also described below. Additionally, points, lines, and polygons represent rendering primitives which are the basis for most rendering instructions utilized to process the data in a patch. More complex structures, such as 3D objects, are formed from a combination or a mesh of such primitives. To display a particular scene on a 2D display, the visible primitives associated with the scene are drawn individually by determining pixels that fall within the edges of the primitives and manipulating the attributes that correspond to each of those pixels. Therefore, the work groups can be further divided into primitive groups (prim groups), which are groups of primitives that can be processed by one or more shader engines.

Because there are thousands, if not millions of primitives, the inefficient processing of primitives reduces system performance when complex images are rendered on a display screen. Conventional graphics pipelines process generated primitives from patches that include data as described above that is used for displaying pixels on a display screen. The patches, depending on size, are divided or combined into prim groups. Each prim group is sent to a shader engine for processing. A shader engine performs tessellation on each patch, (described in more detail below), and converts control points in each patch to multiple primitives. The number of primitives in each patch depends on a tessellation factor. A tessellation factor may be greater for patches processed by one shader engine in comparison to other shader engines. For example, the tessellation factor is typically greater for patches that appear closer on the display screen than the patches that appear further on the display screen.

Because tessellation occurs after patches are distributed to shader engines, the shader engines become unbalanced pre-tessellation. This causes one shader engine to process thousands of primitives, while other shader engines remain idle.

To perform graphics operations, a graphics pipeline is included in a graphics processing unit (GPU). A GPU is a specialized electronic circuit designed to rapidly build and render images on an electronic device and to process graphics on electronic devices. A GPU has a highly parallel structure that is efficient for processing large blocks of data, such as data included in computer graphics applications, images and videos, in parallel. Mathematical data, particularly matrix data, also benefits from GPU processing because many matrix manipulations are performed in parallel. A GPU may form part of a larger processing unit which may include a central (or host) processing unit. A combined processing unit can be referred to as an applications processor, an accelerated processing unit or, simply, a processor.

To process data efficiently, GPUs include hardware pipelines, as mentioned above. Hardware pipelines are formed of fixed function units designed to perform a particular function or are programmed to proces data of a particular type or perform a particular type of a function. A graphics pipeline is programmed to process and render computer graphics, images, and video, for example. Typically, graphics pipelines are comprised of a combination of programmable and fixed function hardware pipelines. As described above, each image or a frame in a video is rendered using primitives that include points, lines, polygons or a combination of primitives that are organized into a mesh. The primitives in each frame or image are rendered individually by determining which pixels fall within the edges of the primitives and calculating the attributes of the primitive that corresponds to each of those pixels. Tessellation performance can be improved by load balancing the processing of tessellation data between shaders/shader engines. An example of load balancing for optimal tessellation performance can be found in U.S. Pat. No. 9,105,125, which is incorporated herein by reference as if fully set forth.

FIG. 1A is a block diagram 100A of an example graphics pipeline, the graphics pipeline 100A includes a work distributor 102 (also referred to as WD 102), input assemblers 104 (also referred to as IAs 104) and shader engines 106 (also referred to as SEs 106).

WD 102 distributes the work to other components in a graphics pipeline for parallel processing. WD 102 receives patches, (e.g., from a driver), that include instructions for rendering primitives on a display screen. The driver receives patches from a graphics application. Once the driver receives patches from the graphics application, it uses a communication interface, such as a communication bus, to transmit patches to a graphics pipeline that begins with WD 102. WD 102 divides patches into multiple work groups that are processed in parallel using multiple SEs 106.

To transmit work groups to SEs 106, WD 102 passes work groups to IAs 104. There can be multiple IAs 104 connected to WD 102. In this example, each IA 104 is coupled to two SEs 106. IAs 104 divide workgroups into primitive groups ("prim groups"). IA 104 then passes the prim groups to SEs 106. IAs 104 can also retrieve data that is manipulated using instructions in the patches, and perform other functions that prepare patches for processing using SEs 106.

In one example, WD 102 distributes prim groups directly to SEs 106. In this example, the functionality of IA 104 is included in WD 102 or in SE 106. In this case, WD 102 passes a prim group to SE 106 for processing. This configuration allows WD 102 to scale the number of prim groups to the number of SEs 106 that are included in the graphics pipeline.

SEs 106 process the prim groups. For example, SEs 106 use multiple compute units to manipulate the data in each prim group so that it is displayed as objects on a display screen. As part of this prim group processing, SEs 106 generate primitives from each prim group. In the graphics pipeline, SEs 106 determine the number of primitives during the tessellation process. In the tessellation process each prim group is broken down into multiple triangles, points or lines. The triangles, points or lines form a mesh that represents an object on the display screen. The number of triangles, points or lines are a function of how close or far an object is being displayed on the display screen. For example, an object that is displayed far away is represented by a fewer triangles, points or lines than the object that appears closer or zoomed in on the display screen.

In a conventional graphics pipeline, the tessellation process occurs after prim groups are distributed to the SEs. Because the tessellation process in each SE generates a different number of primitives, SEs in a conventional graphics pipeline become unbalanced. In extreme cases, some conventional SEs may remain idle while waiting for other SEs to complete primitive processing.

Figure 1B:
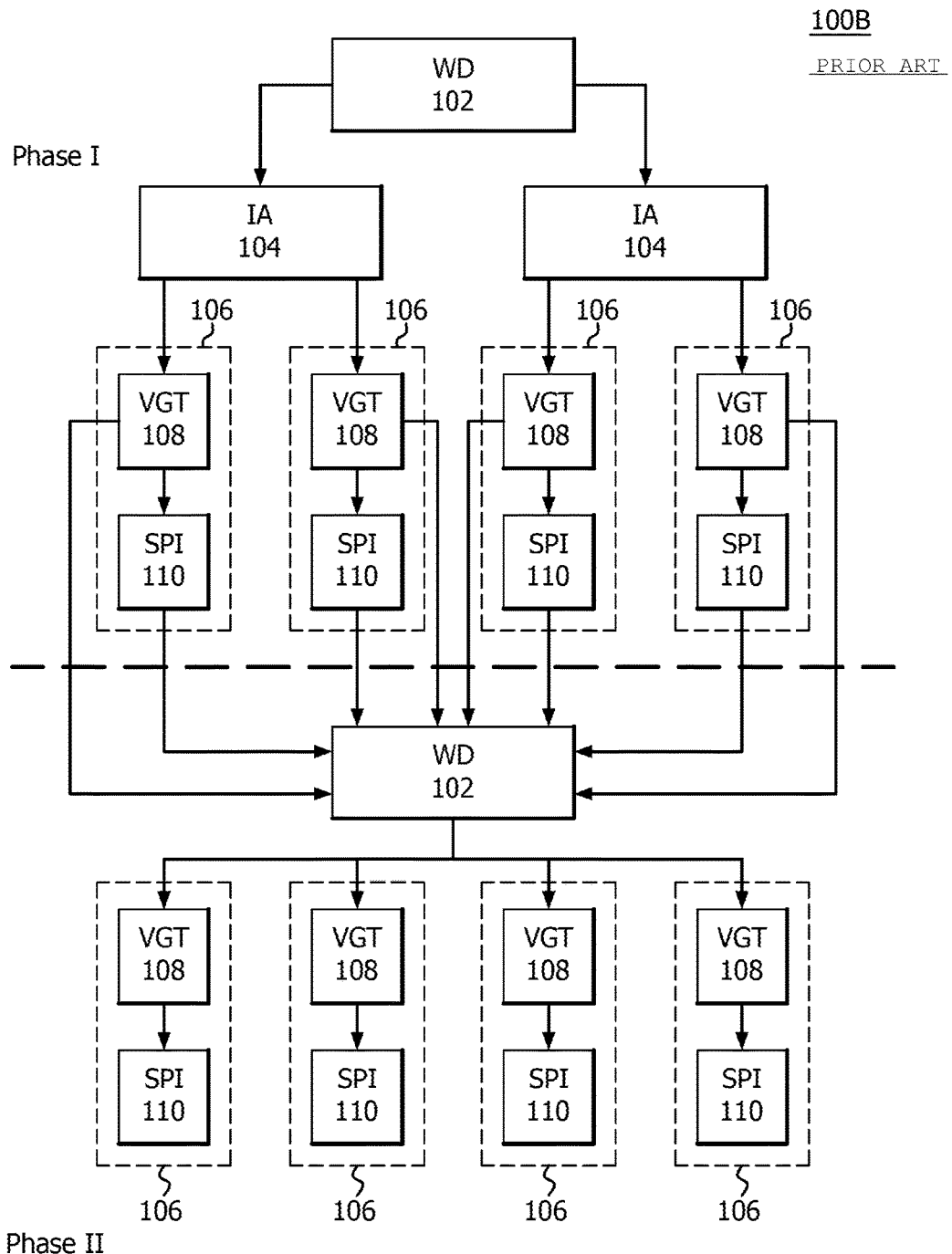
FIG. 1B is a block diagram of an example graphics pipeline that rebalances patches pre-tessellation.

FIG. 1B is a block diagram of an example graphics pipeline 100B that rebalances patches pre-tessellation. The graphics pipeline 100B uses WD 102 to redistribute patches pre-tessellation process. The graphics pipeline 100B includes two phases, phase I and phase II. In phase I, WD 102 distributes prim groups to SEs 106 for processing. In phase II, the prim groups are returned to WD 102 for redistribution pre-tessellation, load balancing prior to further processing on SEs 106.

In phase I, WD 102 distributes patches to SEs 106. When WD 102 receives patches from a driver, it divides patches into work groups and forwards them to IAs 104. The IAs 104 then divide each work group into prim groups. A work group can be twice the size of a prim group.

After each IA 104 divides work groups into prim groups, it sends prim groups to a vertex grouper tessellator (VGT) 108 on SE 106 for processing. IA 104 can distribute prim groups to as many SEs 106 as the number of SEs 106 coupled to each IA 104. In another example, IA 104 divides a workgroup into two prim groups, and sends each prim group to VGT 108 in SE 106.

VGT 108 further groups patches in a prim group into units of work called thread groups. In one example, each prim group includes an exact multiple of thread groups. In another example, there is a 1:1 ratio between thread groups and prim groups. In a Direct 3D ("D3D") environment, for example, the number of patches that are grouped into a thread group can be configured using registers.

VGTs 108 begin processing each thread group from a prim group that it receives from IA 104. VGTs 108 divide thread groups into wave fronts (also referred to as "waves"), where each wave front includes a number of threads that are processed in parallel. VGT 108 then launches the waves to other components in SEs 106, such as a shader processor interpolator (SPI) 110 and compute units, as described in detail in FIG. 2. SPI 110 associates waves or wavefronts with different shader programs. A shader program is written by an application developer, in, for example, OpenGL or D3D. The shader program provides instructions to a compute unit for processing waves on a per element basis. Example shader programs are a local shader, a hull shader, and a domain shader. A local shader manipulates a position, texture coordinates, and color of each vertex in a triangle. A hull shader computes color and attributes, such as light, shadows, specular highlights, and translucency, for example, for each output control point of the patch. A control point, for example, can be a point used to determine the shape of a spline curve or a surface or higher-dimensional object. A domain shader manipulates the surface geometry of the objects that are comprised of multiple triangles on the display screen. SPI 110 is coupled to compute units that process the wave using the associated shader. Compute units include arithmetic logic units (ALU's) that manipulate waves based on instructions provided in the shader programs.

Figure 2:
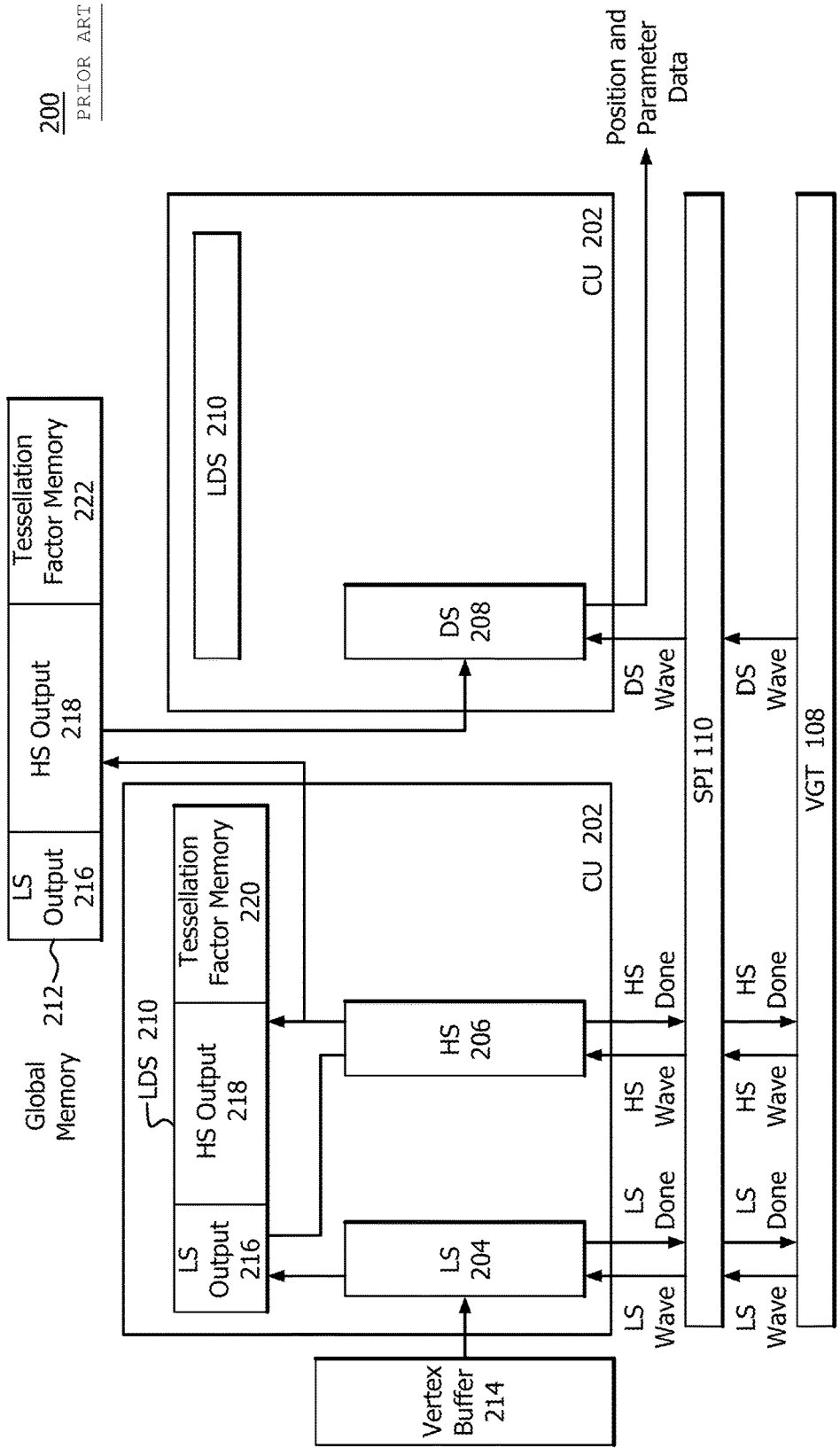
FIG. 2 is an example block diagram of components processing a thread group in a shader engine.

FIG. 2 is an example block diagram 200 of components processing a thread group in a shader engine. For example, block diagram 200 supports patch processing in phase I and phase II in block diagram 100B.

Block diagram 200 includes one or more VGTs 108, an SPI 110, a compute unit 202 (also referred to as CUs 202), a local shader 204 (also referred to as LS 204), a hull shader 206 (also referred to as HS 206), a domain shader 208 (also referred to as DS 208), a local data store memory 210 (also referred to as LDS 210), an off chip memory 212, and a vertex buffer 214. In other implementations, the number and connectivity of these units can vary.

VGT 108 generates waves for each thread group and launches the waves to SPI 110. For example, VGT 108 generates an LS wave for each thread group. LS waves are components in a thread group that are processed by CU 202. SPI 100 associates the LS wave with LS 204 for processing on CU 202. VGT 108 inserts an event, such as a flush event, after it launches all LS waves in the thread group. In some implementations, the flush event indicates to VGT 108 that CU 202 completed processing all LS waves in a thread group.

When SPI 110 receives an LS wave from VGT 108, SPI 110 associates the LS wave with LS 204. LS 204 fetches the patch data associated with the LS wave from on chip or off chip memory, or a memory buffer, described below. For example, at this point in a graphics pipeline each patch is a set of control points. Each control point is associated with patch data that includes attributes such as a position, texture coordinates, and color. In an example, LS 204 then fetches the attributes for each control point from vertex buffer 214. Vertex buffer 214 is a temporary memory storage that stores attributes associated with control points included in LS wave. A temporary memory storage can include volatile memory storage that temporarily stores data. Volatile memory typically stores data as long as electronic device receives power, and may lose its memory state when the power is lost. A person skilled in the art will further appreciate that attributes stored in vertex buffer 214 may be from the memory storage.

Once the data is fetched from vertex buffer 214, CU 202 executes LS 204 once for each control point in the patch. In one example, each patch can include between 1 and 32 control points. In an example, SPI 110 also allocates memory space in LDS 210 and global memory 212 for a thread group. Typically, LDS 210 is an on-chip memory that is built into CU 202. Global memory 212 is a memory storage located outside of a GPU chip and is an off-chip memory. Global memory 212 can also be an on-chip memory as well. LDS 210 and global memory 212 can include volatile and non-volatile memory for storing data. Example volatile memory includes a random access memory (RAM). Volatile memory typically stores data as long as electronic device receives power, as described above. Example non-volatile memory includes read-only memory, flash memory, ferroelectric RAM (F-RAM), hard disks, floppy disks, magnetic tape, optical discs, etc. Non-volatile memory retains its memory state when the electronic device loses power or is turned off. Data in the non-volatile memory can be copied to the volatile memory prior to being accessed by the components in a graphics pipeline.

SPI 110 allocates space in LDS 210 to store LS output 216 and HS output 218. SPI 110 is coupled to CU 202. CU 202 processes wave fronts using an associated shader. For example, SPI 110 sends an LS wave to CU 202 for processing using LS 204. During processing, CU 202 retrieves control point attributes for the control points that are included in LS wave from vertex buffer 214 and uses LS 204 to manipulate the control point attributes.

Once LS 204 uses CU 202 to manipulate the attributes associated with control points in the LS wave, LS 204 writes the manipulated LS data to LDS 210 as LDS output 216. At this point in graphics pipeline, the number of control points in each patch remains the same, although the control points may have different values.

LS 204 can also store LS output 216 to global memory 212. When CU 202 completes processing LS waves, it sends a signal to SPI 110. SPI 110 then transmits the signal to VGT 108. For example, SPI 110 sends the signal to VGT 108 for each thread group, such as when all LS waves in a thread group complete processing using CU 202.

As with LS waves, VGT 108 launches HS waves, which are components in a thread group that are also processed by CU 202, to SPI 110. VGT 108 inserts, for example, an event when it launches HS waves associated with a thread group to SPI 110. HS 206 transforms an input patch in the thread group into an HS output patch. In an HS output patch, the number of control points and the value of control points can be different. CU 202 stores the HS data generated using the HS wave as HS output 218 in LDS 210. Additionally, HS 206 determines the value of tessellation factors for each patch. For example, HS 206 determines the screen space required to display a patch. The patch that is closer to a viewer requires more tessellation than the patch that is further away from a viewer. Moreover, the value of tessellation factors is proportional to the number of primitives that are generated for each patch. For example, the higher the value of tessellation factors the more primitives are generated for the patch. For purposes of example, the viewer is a point in space with respect to which object appear on the display screen. Tessellation factors generated using each HS wave are stored in tessellation factor memory 220.

The number of tessellation factors depends on a type of a patch. For example, for a quad patch HS 206 computes six tessellation factors. The tessellation factors are used to determine how the quad patch may be divided into multiple triangles that form a mesh. In an example, a mesh defines a three dimensional object in a graphics environment.

HS 206 generates tessellation factors for each patch having different values. These values can range from 1 to 64. When VGT 108 sends an HS wave to SPI 110, it also sends the thread group information associated with the HS wave to WD 102. In an example, WD 102 uses the thread group information to redistribute work among multiple VGTs 108 after HS 206 generates tessellation factors for each patch.

CU 202 receives HS waves from SPI 110 and uses HS 206 to generate tessellation factors from patches included in each HS wave. In an example, HS shader 206 includes instructions to write the generated tessellation factors to tessellation factor memory 220 and HS output data to HS output 218 in LDS 210.

Once CU 202 completes processing an HS wave of a thread group, HS 206 copies the tessellation factors and HS output 218 from LDS 210 to global memory 212 in one example. For example, global memory 212 can also store HS output 218. In another example, global memory 212 also includes tessellation factor memory 222 that stores tessellation factors. Global memory 212 can store HS output 218 and tessellation factors for all SEs 106 that process patches for work groups. The HS output 218 and tessellation factors may include the thread group number for WD 102 to identify a thread group and a patch that generated a particular HS output 218 and tessellation factors. Example methods for performing the copy described above is described in further detail below.

When CU 202 completes processing on the HS wave, CU 202 sends a signal to SPI 110 that indicates that CU 202 completed processing of all HS waves in a thread group. In an example, SPI 110 also sends a signal to WD 102 that indicates that SPI 110 completed processing of HS waves.

With reference back to FIG. 1B, when WD 102 receives a signal from VGTs 108 that CU 202 completed processing of all HS waves, phase I completes. At this point, the values of tessellation factors for each patch in a thread group has been calculated using HS 206. The tessellation factors and the corresponding HS output 118 are stored in global memory 212, as described above.

In a conventional graphics pipeline, when tessellation factors are generated using SEs, SEs continue to process the thread groups that were distributed to SEs by a WD. SEs continue to process the thread groups even though each SE needs to process different value of tessellation factors which leads to an unbalanced graphics processing system.

Unlike conventional systems, the example graphics pipeline in block diagram 100B redistributes thread groups pre-tessellation to rebalance patch processing on SEs 106. After tessellation factors are generated, WD 102 redistributes the patches to different threads groups prior to further processing on the same or different SEs 106. The redistribution is based on the generated tessellation factors. In this way, WD 102 ensures that SEs 106 are load-balanced while processing tessellation factors associated with the patches.

As described above, FIG. 1B depicts Phase II processing of the graphics pipeline. In FIG. 1B, WD 102 redistributes patches to different prim groups. Once WD 102 redistributes patches to different prim groups, WD 102 transmits the new prim groups to VGTs 108 for processing, as described in detail below.

Figure 3:
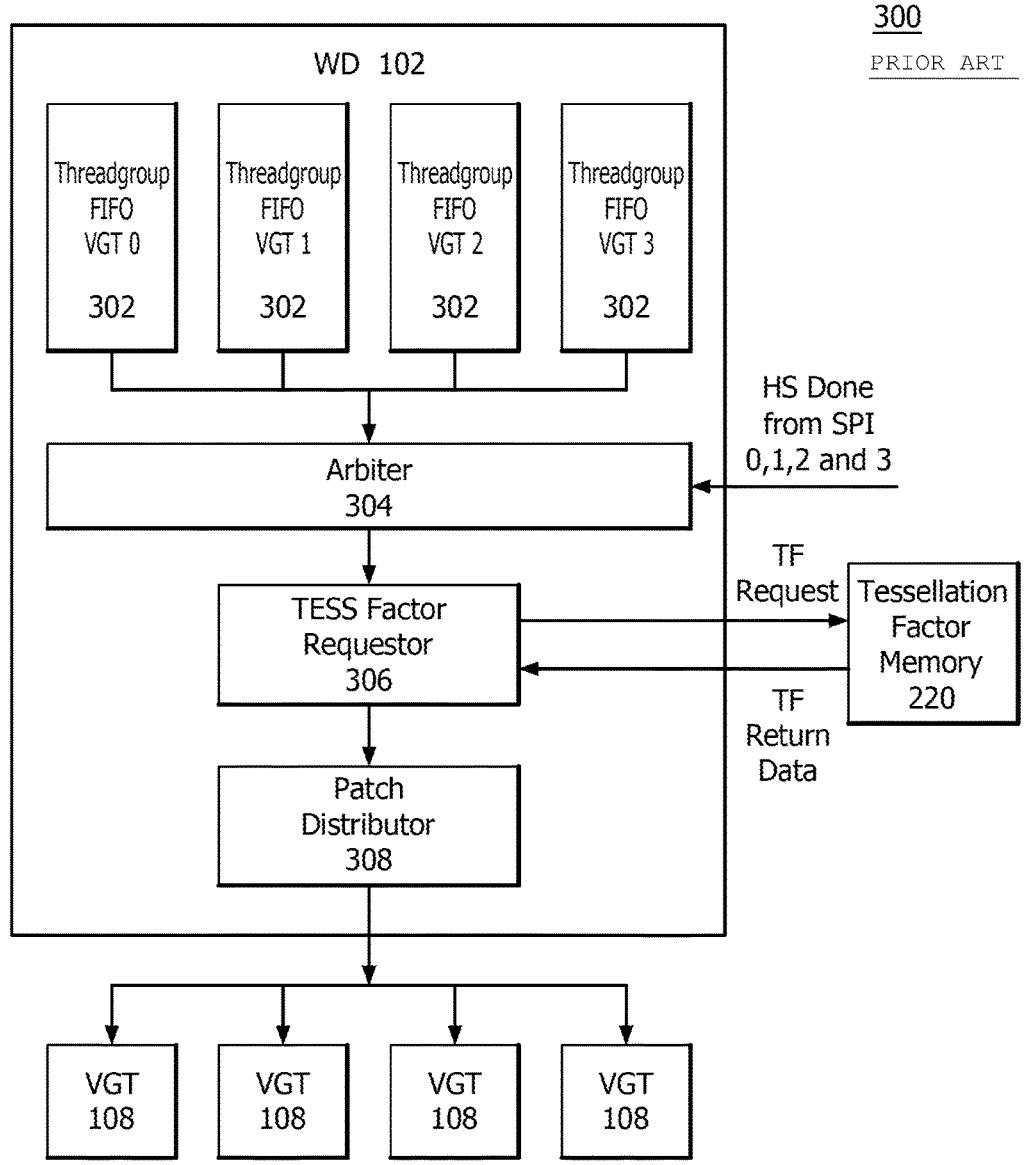
FIG. 3 is an example block diagram of a work distributor redistributing patches to different shader engines.

FIG. 3 is an example block diagram 300 of a work distributor 102 redistributing patches to different shader engines. WD 102 redistributes patches to different SEs 106 based on the generated tessellation factors. WD 102 in block diagram 300 includes a thread group queue 302 associated with each VGT 108, an arbiter 304, a tessfactor requester 306, and a patch distributor 308.

When CU 202 completes processing HS waves using HS 206, CU 202 stores HS output 218 and tessellation factors in memory and routes the thread groups information back to WD 102. Thread group queue 302 on WD 102 stores thread group information associated with each thread group. Example thread group information that VGTs 108 routes to WD 102 includes a number of patches that are included in each thread group, a thread group identifier, location of the tessellation factors in tessellation factor memory 222, etc. Thread group queue 302 stores the thread group information using first-in, first-out (FIFO) methodology. Thread group information also includes information regarding the processing order of each thread group and prim group.

WD 102 includes a thread group queue 302 that corresponds to each VGT 108. For example, if the graphics pipeline includes four VGTs 108 that receive work from WD 102, WD 102 includes four thread group queues 302, where each thread group queue 302 corresponds to a particular VGT 108. Arbiter 304 receives thread group completion information from SPI 110. For example, SPI 110 associated with each VGT 108 sends a signal to WD 102 when HS 206 completes processing HS waves for each thread group on CU 202. Thus, in an example that includes four SEs 106 that process thread groups, each of the four SPIs 110 may send a signal to WD 102, i.e., one signal per thread group. Arbiter 304 receives the signal from SPI 110 and communicates to WD 102 that HS 206 completed processing the thread group on a particular VGT 108.

When WD 102 determines that the thread groups on a particular VGT 108 completed processing, WD 102 reads the tessellation factors that are associated with the completed thread group from global memory 212. In an example, WD 102 uses the same order to read thread group information from thread group queue 302, as the order that the thread groups were processed on VGTs 108. For example, if WD 102 assigned thread groups to VGT 0, VGT 1, VGT 2 and VGT 3 (not shown), where the first thread group was assigned to VGT 0, the second thread group was assigned to VGT 1, etc., WD 102 may retrieve thread group information from thread group queue 302 associated with VGT 0, then from thread group queue 302 associated with VGT 1, and so on.

WD 102 determines the order for each thread group using counters associated with each thread group and/or prim group when it is initially routed to IAs 104 and VGTs 108. For example, when WD 102 divides a packet into prim groups, it may tag each prim group with a prim group counter that indicates the issuance order of each prim group in phase I. VGT 108 can then tag each thread group with a thread group counter that identifies the thread group processing order in CU 202.

When arbiter 304 receives the signal from SPI 110 that the processing of HS waves is complete, WD 102 uses the prim group and thread group counters to ensure that the order that each thread group was launched for processing on SEs 106 is maintained. For example, WD 102 uses the prim group counter and the thread group counter to identify thread group queue 302 from which to retrieve thread group information to redistribute thread groups for phase II processing.

When WD 102 retrieves thread group information from a particular thread group queue 302, tessfactor requester 306 uses the thread group information to retrieve tessellation factors associated with the patches in the thread group from tessellation factor memory 222. The thread group information includes a number of patches and a type of tessellation factors for each patch. For example, a thread group can include five patches, each patch having a quad tessellation type. The quad tessellation type includes six tessellation factors, for example. Therefore, the total number of tessellation factors stored in tessellation factor memory 222 for the five patches is 30. Tessfactor requester 306 then retrieves the 30 tessellation factors associated with the five patches from tessellation factor memory 222.

Based on the tessellation factors in each patch, patch distributor 308 redistributes patches to VGTs 108 for further processing. Patch distributor 308 may include multiple heuristics that it uses to redistribute patches. In one example, path distributor 308 calculates a number of primitives that can be generated for each patch. In another example, patch distributor 308 determines an estimate of the number of primitives that can be generated for each patch based on the tessellation factors.

An application developer or a user can set a tessellation factor threshold. The tessellation factor threshold indicates a total value of factors that VGT 108 can process in parallel with other VGTs 108. WD 102 uses the tessellation factor threshold as an upper bound for the total value of tessellation factors in patches that it routes to each VGT 108.

Patch distributor 308 attempts to estimate the number of patches that are sent to each VGT 108 based on the tessellation factors and the tessellation type of each patch. In an example, each tessellation type generates a minimum number of inside tessellation factors that are a subset of all tessellation factors for the patch. Patch distributor 308 then adds the inside tessellation factors for multiple patches until it reaches the tessellation factor threshold. The patches that patch distributor 308 includes in the summation are then sent to a particular VGT 108. This heuristic attempts to ensure that each VGT 108 processes patches that in totality have the value of tessellation factors bounded by the tessellation factor threshold. This ensures that each VGT 108 receives approximately the same amount of work from WD 102.

In another example, a single patch can be a high tessellation factor patch. For example, a high tessellation factor patch can have a tessellation factor of 64. A high tessellation factor patch can produce work that overwhelms a single VGT 108. A high tessellation patch can also include a value of estimated tessellation factors that is greater than the configured tessellation factor threshold.

To process the high tessellation factor patch, patch distributor 308 splits the high tessellation factor patch for processing using multiple VGTs 108. The patch distributor 308 also maintains the order that WD 102 and IAs 104 used to distribute patches to VGTs 108 in phase I. Thus, a patch that was processed subsequent to another patch in phase I is processed subsequent to that patch in phase II.

When patch distributor 308 redistributes patches of a thread group from phase I to a different thread group for phase II, WD 102 sends a signal to VGT 108 that processed the thread group in phase I. The signal indicates that the thread group processing of phase I is complete and VGT 108 can cause SPI 110 to de-allocate the memory space in LDS 210 and off-chip memory 212 for LS output 216 associated with the thread group.

With reference back to FIG. 2, when VGT 108 receives the tessellated patches in phase II, VGT 108 divides the patches into thread groups. VGT 108 then generates the necessary DS wave for each thread group and launches the DS waves to SPI 110. When SPI 110 receives the DS waves, it associates DS waves with a DS 208. DS 208 generates a surface geometry from the control points generated using HS 206 and the UV coordinates associated with each control point. UV coordinates are two-dimensional (2D) coordinates that are mapped to a 3D model, and range from 0 to 1. The DS wave can then be processed by one or more single instruction multiple data ("SIMD") units in CU 202.

The input to DS 208, in an example, are control points manipulated using HS 206 and tessellation factors associated with a patch included in a thread group. The control points and tessellation factors are retrieved from global memory 212, for example.

SPI 110 manages thread group tessellation information located in global memory 212. In one example, WD 102 includes a counter for each SE 106 in phase I. The counter increments for each tessellation thread group that is issued to the respective SE 106. In phase II, WD 102 passes the counter to VGT 108 for each patch, as part, for example, of the DS wave interface. SPI 110 uses the counter to identify the location in tessellation factor memory 222 located in global memory 212 to retrieve tessellation factors associated with the thread group. SPI 110 also uses the counter to retrieved HS output 218 stored in global memory 212 that is an input to DS 208.

After DS 208 completes processing thread groups, the generated primitives in the thread groups are processed using other components in the graphics pipelines for display on a display screen.

In an example, memory space in LDS 210, global memory 212 and tessellation factor memory 220 and 222 require allocation and de-allocation during phase I and phase II processing in the graphics pipeline. For example, SPI 110 on each SE 106 allocates memory space in LDS 210 on each respective SE 106. In an example, SPI 110 allocates memory space for LS output 216 when SPI receives an LS wave from VGT 108. SPI 110 also allocates the memory space for HS output 218 when SPI 110 receives an HS wave from VGT 108. In another example, SPI 110 allocates memory space for LS output 216 and HS output 218 when it receives an LS wave from VGT 108. SPI 110 can de-allocate the memory space allocated for LS output 216 and HS output 218 once CU 202 completes phase I and phase II processing.

Because thread groups are redistributed pre-tessellation, after SE 106 writes LS output 216 and HS output 218 to on-chip LDS 210, SE 106 copies LS output 216 and HS output 218 to global memory 212, (e.g., a remote memory location). As described above, global memory 212 can be a global memory accessible to multiple SEs 106. Once SE 106 copies LS output 216 and HS output 218 to global memory 212, the output is accessible to other SEs 106. This allows SEs 106 to access global memory for LS output 216 and HS output 218 when WD 102 redistributes the patches in phase II. Methods for copying to global memory are described in more detail below.

VGT 108 also manages tessellation factor memories 220 and 222. Tessellation factor memory can be located within LDS 210 or off-chip memory 212, or a combination of both. In an example, tessellation factor memory can be implemented as a ring buffer. During phase I, SPIs 110 allocate tessellation factor memory 220 in LDS 210. Tessellation factor memory 220 stores tessellation factors generated using HS 206. When phase I completes, tessellation factors stored in tessellation factor memory 220 on LDS 210 are copied to tessellation factor memory 222 located on global memory 212. This allows other SEs 106 to access the tessellation factors associated with patches after the patches are redistributed in phase II. WD 102 then accesses tessellation factor memory 222 to retrieve tessellation factors for each patch during phase II when it redistributes patches to SEs 106 for further processing. Methods for performing copying to global memory 212 are described in further detail below.

As mentioned above, data, such as the tessellation factors, can be copied, to global memory 212. This allows one shader or compute unit, (e.g., one SE 106 or CU 202), to access data and perform parallel processing separate from another shader or compute unit, (e.g., a separate SE 106 or CU 202). It should be noted that, below, the use of the term data generally refers to data such as tessellation factors or the like as described above, However, the methods described herein can be utilized for copying of additional types of data not specifically described.

Figure 4A:
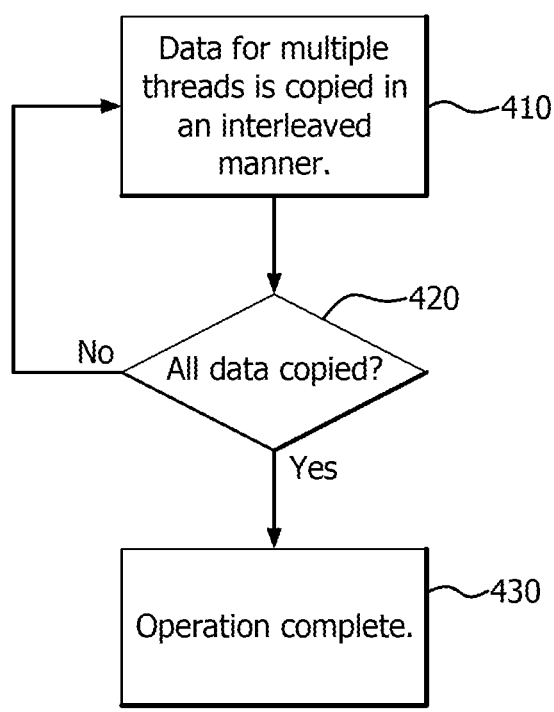
FIGS. 4A-4D are flow diagrams of example methods of copying data to global memory.
Figure 4B:
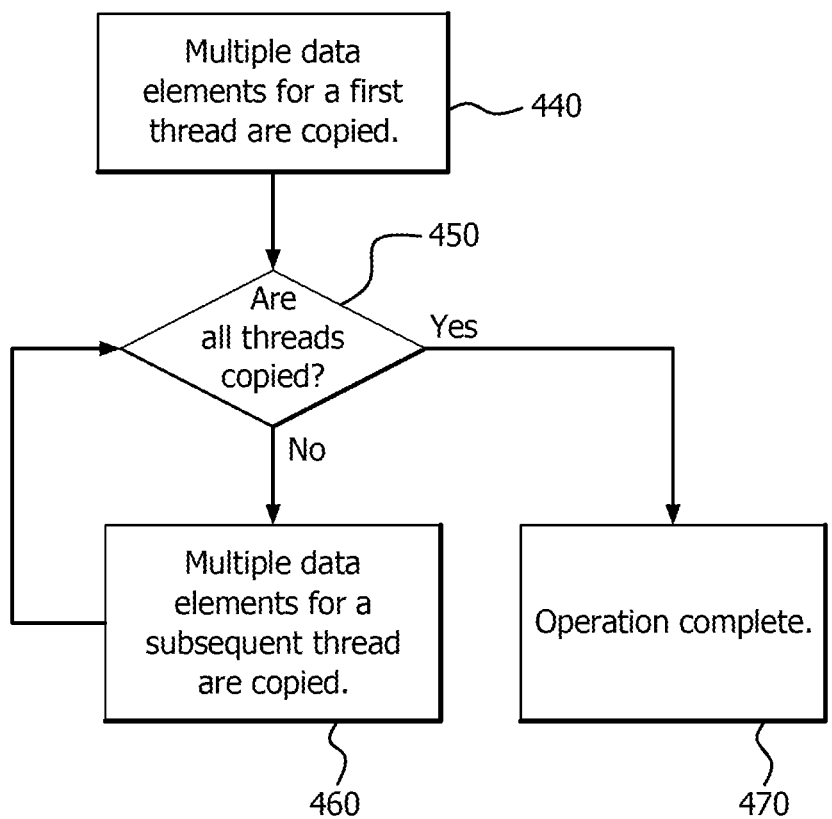

FIGS. 4A-4D are flow diagrams of example methods 400A, 400B, 400C, and 400D of copying data from a local memory location, (e.g., LDS 210), to global memory, (e.g., global memory 212). Although, each method is described in more detail below, a brief description of each method is provided here for convenience. FIG. 4A is a flow diagram of an example method 400A for performing interleaved copying. FIG. 4B is a flow diagram of an example method 400B for performing a multi-element fullwave copy operation.

Figure 4C:
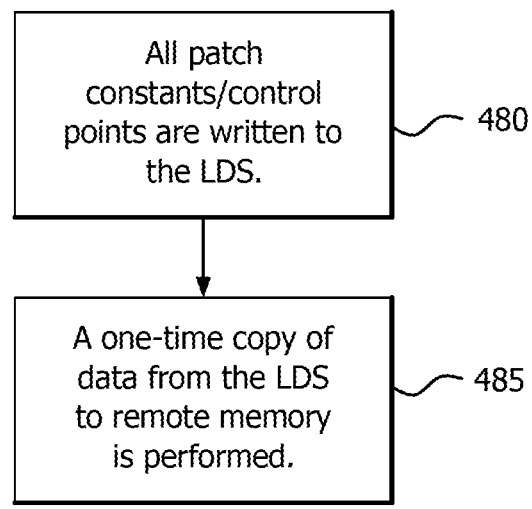
Figure 4D:
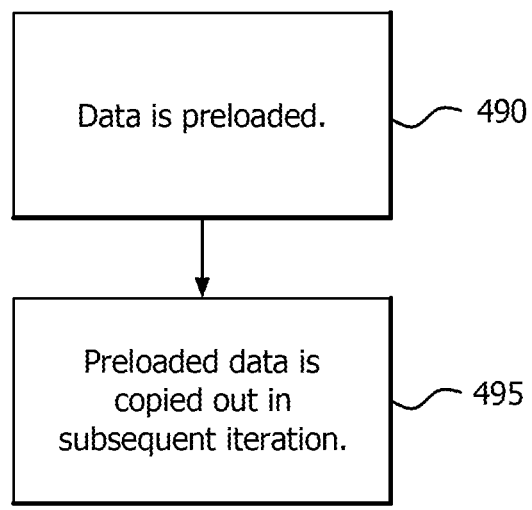

FIG. 4C is a flow diagram of an example method for performing a data copy to an LDS before copying data to global memory. FIG. 4D is a flow diagram of an example method for performing a data copy by pipelining the data. In all four methods, (i.e., 400A, 400B, 400C, and 400D), the copy operations relate to the copying of data from a local memory location such as LDS 210 to a remote memory location, such as global memory 212 described above.

Figure 4E:
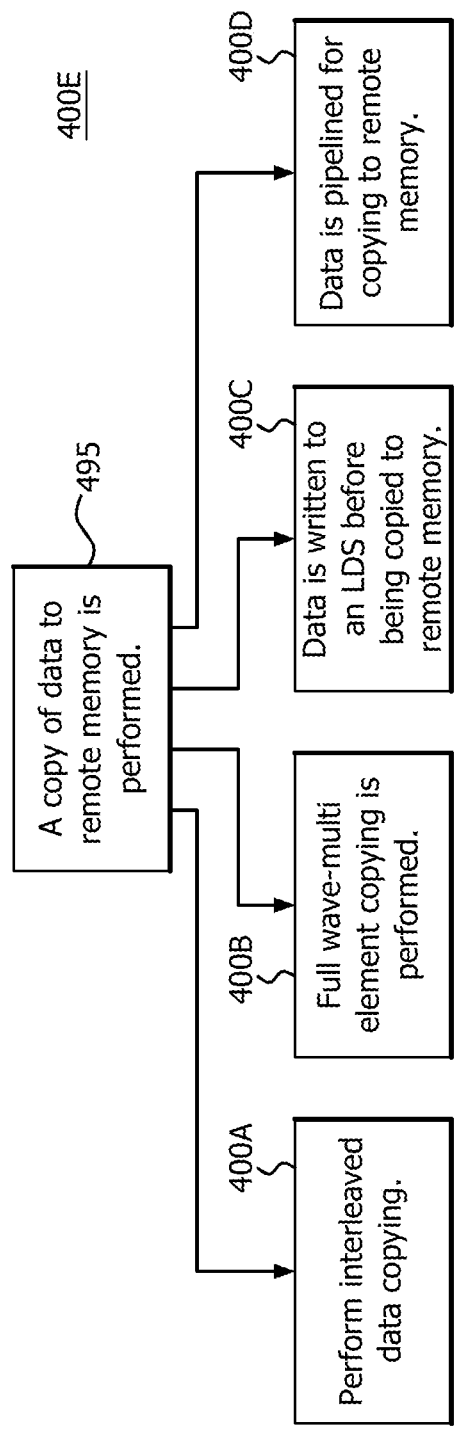
FIG. 4E is an example block diagram depicting a copy process proceeding to one of the methods depicted in FIGS. 4A-4D.

FIG. 4E is an example block diagram depicting a copy process 400E proceeding to one of the methods depicted in FIGS. 4A-4D. In block 495, when a copy is to be made from the local memory location to the remote memory location, a predefined criteria can be utilized to determine one of the methods 400A, 400B, 400C or 400D to be used for a particular copy operation.

Figure 5A:
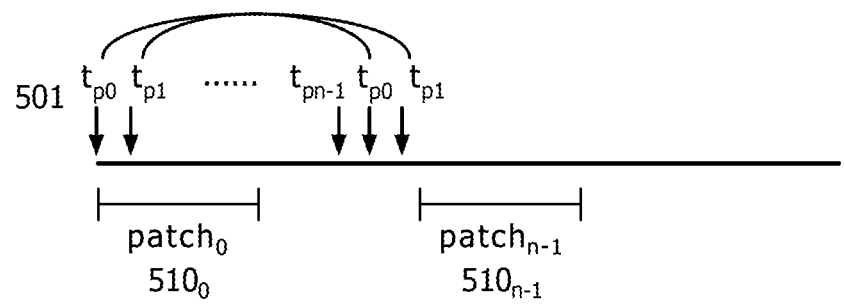
FIG. 5A is a diagram depicting an example of interleaved data copying to global memory.

Referring back now to FIG. 4A, in step 410 data for multiple threads is copied in an interleaved manner. FIG. 5A is a diagram depicting an example of interleaved data copying 501, corresponding to method 400A, from a local memory location, (e.g., LDS 210), to global memory, (e.g. 212), which for purposes of example is considered a remote memory location. The example interleaved data copying operation 501 is shown having threads designated tp0, tp1, . . . , tpn−1 and patches, (designated patch0 $510_0$, and $patch_{n-1}$ $510_{n-1}$), where n is the number of patches per thread group, and there is one thread for each patch. The copy operation depicted in FIG. 5A shows thread data being copied from "left to right" for purposes of example, which conveys copying from any local memory location, (e.g., LDS 210), to the remote memory location, (e.g., global memory 212). The data for each thread is copied, (e.g., 16 bytes of data), in each iteration of a copy loop, which is a loop that copies 16 byte segments of data until all data is copied. The copying is performed by one of the components described above, such as the SE 106 or CU 202, for example. All thread data is copied in an interleaved fashion as shown in FIG. 5A. That is, the first thread tp0 of the first patch has its 16 bytes of data copied, the second thread tp1, which is the first thread of the second patch, has the next 16 bytes of data copied, for example, to improve locality. The data for each thread is copied in an interleaved fashion until all needed data is copied to the remote memory location, (e.g., global memory 212). That is, once all the data for all threads to be copied is copied in an interleaved fashion to the remote memory location, (step 420) the operation is complete and proceeds to step 430, otherwise the method reverts to step 410.

Referring now to FIG. 4B, in step 440 multiple data elements, (attributes), for a first thread of a wavefront are copied. That is, the attributes of a control point or attributes of patch constraints described above are copied to the remote memory location, (e.g., global memory 212) for the first thread. The size of the attributes are used to determine the multiple data elements to copy in each iteration of the copy loop. For example, if a number of D-words, (which are words having a predefined length), are to be copied in each iteration of the copy loop, then the multiple D-words are copied consecutively because of their size. Because in a situation where there are 64 D-words, the possibility exists that 4 cache lines could be touched by those D-words if the cache line size is 64 bytes. By copying consecutive D-words, the number of cache lines that are affected, (i.e., touched), during the copy operation is reduced.

Figure 5B:
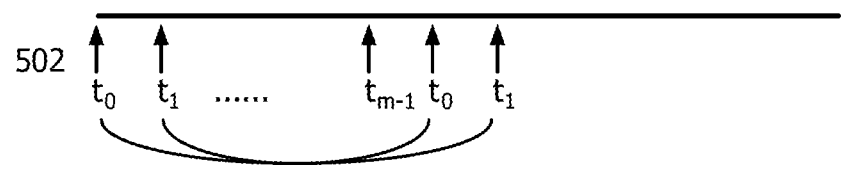
FIG. 5B is a diagram depicting an example of full wavefront data copying to global memory.

FIG. 5B is a diagram depicting an example of full wavefront data copying 502 to global memory 212 corresponding to the method 400B, where thread t0 (e.g., a first thread) has a first group of multiple data elements copied. This step is followed if all data from all threads for a first patch have not been copied (step 450), by a subsequent thread t1 having the next group of multiple data elements copied (step 460), and so on. Once all threads from the first patch finish having all of their multiple data elements copied (step 450), the operation for that first patch is complete (step 470). However, a subsequent round of multiple element data copying is commenced where multiple data elements from a first thread from the next patch of the wavefront are to be copied. That is, thread t0 of the next patch then has its multiple data elements copied after what is copied by the last thread tm−1 from the previous patch. The process continues until all information in all threads is copied. It should be noted that m can be larger than an optimal number of patches, which can increase parallelism for the copy operation. In this example, although each loop iteration performs additional work, (i.e., the copying of multiple elements at a time), the overall number of iterations is ultimately reduced. Associated copy loop overhead can therefore be reduced.

Referring now to FIG. 4C, in the copy operation described in step 480, all data to be copied, (e.g., all the patch constants or control point data), is written to a local memory location, such as LDS 210, before being copied to the remote memory location, (e.g., global memory 212). Once all the data is written to the LDS 210 in step 480, a one-time copy of the entire data to the remote memory location, (e.g., global memory 212), including all of the control points and patch constants, is performed for all threads of a wavefront to be copied (step 485). By writing data to the LDS 210 first, memory latency is reduced by transforming memory references, (i.e., information that refers to addresses where data is stored), of control points and patch constants first into faster LDS references and performing a one-time data copy using a full wavefront of threads. This results in increased efficiency and power savings on a data bus.

Referring now to FIG. 4D, the data copy is performed by pipelining the data, such as by utilizing a software program that performs the pipelining during the copy loop operation. In general, data to be copied is loaded in an iteration of the copy loop for utilization in a subsequent iteration. That is, the data is preloaded for later use (step 490). For example, a software iteration phase that precedes the first iteration in the copy loop can be referred to as a prolog phase of the copy loop. So prior to the copy loop commencing, data is preloaded during the prolog phase for eventual storage to the remote data location. In each iteration of the copy loop, data that is to be used in a later iteration, (e.g., the next iteration), is preloaded for eventual storing to the remote memory location. The number of iterations between a phase or iteration where the data is preloaded, and the iteration where the data is used, (i.e., stored), can be based on the latency requirements for the memory access of the data. Once the data is preloaded, it is then copied out to the remote memory location, (e.g., global memory 212), in a subsequent iteration (step 495). Since the data is already available in the current iteration for writing out by being preloaded in an earlier phase/iteration of the copy loop, latency is hidden, (i.e., is not an issue). It should be noted that although the software pipelining approach described is applied for copying tessellation data, it can be applied to loops for addressing memory latency in any type of shader.

Figure 6:
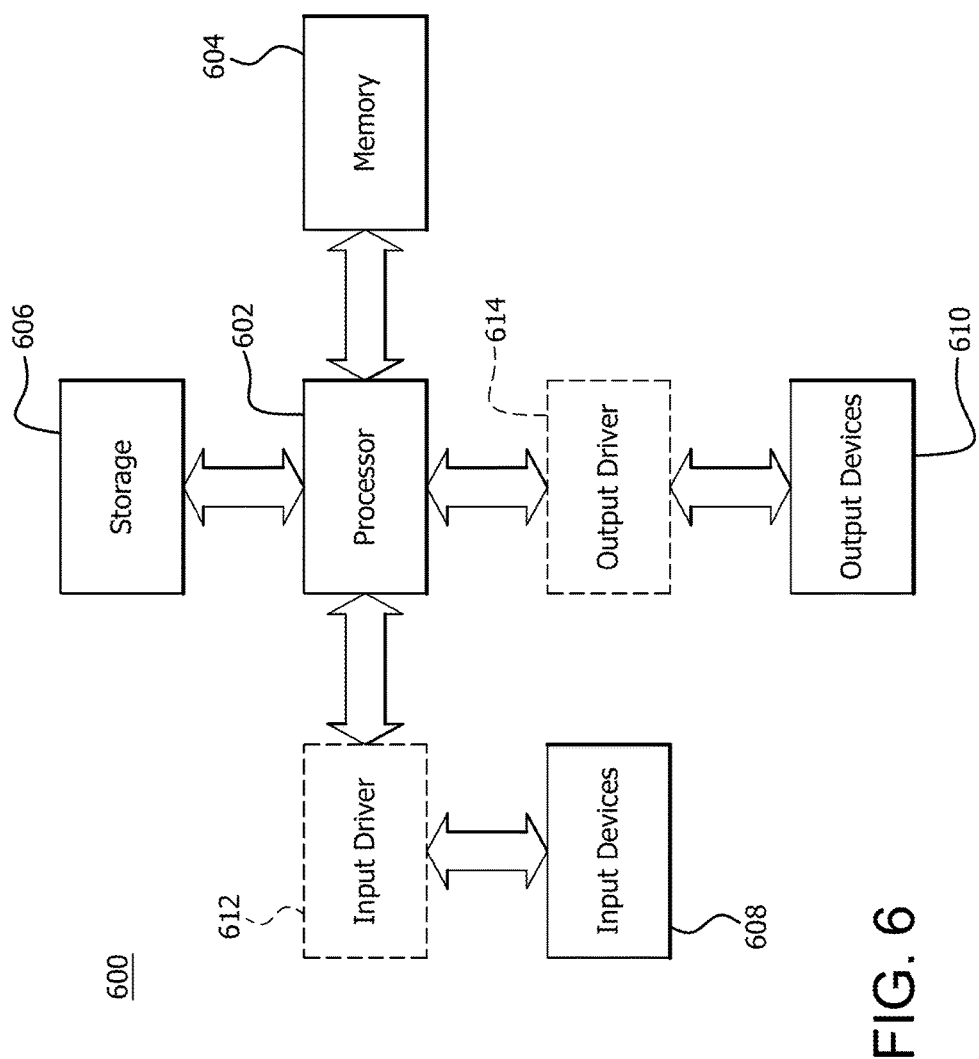
FIG. 6 is a block diagram of an example device in which one or more disclosed examples can be implemented.

FIG. 6 is a block diagram of an example device 600 in which one or more disclosed embodiments can be implemented. The device 600 can include, for example, a computer, a gaming device, a handheld device, a set-top box, a television, a mobile phone, or a tablet computer. The device 600 includes a processor 602, a memory 604, a storage 606, one or more input devices 608, and one or more output devices 610. The device 600 can also optionally include an input driver 612 and an output driver 614.

The processor 602 can include a central processing unit (CPU), a graphics processing unit (GPU), a CPU and GPU located on the same die, or one or more processor cores, wherein each processor core can be a CPU or a GPU. The memory 604 can be located on the same die as the processor 602, or can be located separately from the processor 602. The memory 604 can include a volatile or non-volatile memory, for example, random access memory (RAM), dynamic RAM (DRAM), or a cache. Additionally, the memory 604 can be a local memory, such as an L1 cache memory, or a remote memory, such an L2 cache memory, which can be an on-chip memory, or off-chip memory as described above. The processor 602 can also include an on-board local memory (not shown), for which a copy operation can occur with data being copied from such local memory of the processor 602 to a remote memory location, which in such example can be memory 604.

The storage 606 can include a fixed or removable storage, for example, a hard disk drive, a solid state drive, an optical disk, or a flash drive. The input devices 608 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 610 can include a display, a speaker, a printer, a haptic feedback device, one or more lights, an antenna, or a network connection (e.g., a wireless local area network card for transmission and/or reception of wireless IEEE 802 signals).

The input driver 612 communicates with the processor 602 and the input devices 608, and permits the processor 602 to receive input from the input devices 608. The output driver 614 communicates with the processor 602 and the output devices 610, and permits the processor 602 to send output to the output devices 610. It is noted that the input driver 612 and the output driver 614 are optional components, and that the device 600 will operate in the same manner if the input driver 612 and the output driver 614 are not present.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, graphics processor, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of copying data from a first memory location to a second memory location to improve memory access performance of a system including a plurality of processors, comprising:
    processing a first data, by a first processor operatively coupled to the first memory location and the second memory location, and generating a second data;
    performing, by the first processor, a first copy operation, the first copy operation including: performing interleaved data copying, wherein performing interleaved data copying further comprises copying the second data by copying threads of patches of the second data by interleaving, and performing a full wavefront copy operation;
    copying, by the first processor, in accordance with the first copy operation, the second data from the first location to the second memory location; and
    accessing, by a second processor operatively coupled with the second memory location, the second data from the second memory location for further processing by the second processor.

2. The method of claim 1, wherein each of the threads has 16 bytes of data copied in each iteration of a copy loop.

3. The method of claim 2 wherein the interleaved data copying is performed until all data is copied.

4. The method of claim 1 wherein performing a full wavefront copy operation includes copying multiple elements, wherein the multiple elements are control point attributes or patch constraints.

5. The method of claim 4 wherein once all data for all threads of a first patch are copied, all data for all threads of a second patch are copied.

6. The method of claim 1, further comprising performing, by the first processor, a second copy operation, wherein the second copy operation includes copying all of the second data to a local data store (LDS) prior to copying to the second memory location, or pipelining the second data for copying.

7. The method of claim 6 wherein copying the data to the LDS further comprises writing patch constants or control points to the LDS.

8. The method of claim 7, further comprising performing a one-time copy of all data copied into the LDS to the second memory location.

9. The method of claim 6 wherein pipelining the data for copying includes loading data in a first iteration of a copy loop for use in a subsequent iteration of the copy loop.

10. The method of claim 9, further comprising writing out the loaded data to the second memory location in the subsequent iteration of the copy loop.

11. An apparatus for improving memory access performance of a system including a plurality of processors, comprising:
    a first memory location;
    a second memory location;
    a first processor operatively coupled with the first and second memory locations; and
    a second processor operatively coupled with the second memory location, wherein the first processor is configured to:

process a first data and generate a second data;

perform a first copy operation including: performing interleaved data copying, wherein performing interleaved data copying further comprises copying the second data by copying threads of patches of the second data by interleaving, and performing a full wavefront copy operation;

copy the second data from the first location to the second memory location, in accordance with the first copy operation, and wherein the second processor is configured to access the second data from the second memory location for further processing by the second processor.

12. The apparatus of claim 11, wherein the first processor copies 16 bytes of data in each iteration of a copy loop.

13. The apparatus of claim 11 wherein the first processor performs a full wavefront copy operation that includes copying multiple elements of data, wherein the multiple elements are control point attributes or patch constraints.

14. The apparatus of claim 13 wherein once all data for all threads of a first patch are copied, all data for all threads of a second patch are copied.

15. The apparatus of claim 11 wherein the first processor is configured to perform a second copy operation, the second copy operation including copying all the second data to a local data store (LDS) prior to copying to the second memory location, or pipelining the second data for copying.

16. The apparatus of claim 15 wherein the first processor writes patch constants or control points to the LDS.

17. The apparatus of claim 16, further comprising the first processor performing a one-time copy of all data from the LDS to the second memory location.

18. The apparatus of claim 15 wherein the first processor loads data in an execution pipeline in a first iteration of a copy loop for use in a subsequent iteration of the copy loop.

19. The apparatus of claim 18, wherein the first processor writes out the loaded data to the second memory location in the subsequent iteration of the copy loop.

20. A non-transitory computer-readable medium having instructions recorded thereon, that when executed by a computing device to improve memory access performance of a system including a plurality of processors, cause the computing device to perform operations including:

processing a first data, by a first processor operatively coupled to a first memory location and a second memory location, and generating a second data;

performing, by the first processor, a first copy operation including: performing interleaved data copying, wherein performing interleaved data copying further comprises copying the second data by copying threads of patches of the second data by interleaving, and performing a full wavefront copy operation;

copying, by the first processor, in accordance with the first copy operation, the second data from the first location to the second memory location; and accessing, by a second processor operatively coupled with the second memory location, the second data from the second memory location for further processing by the second processor.

* * * * *